United States Patent [19]

Dybel et al.

[11] 4,059,991
[45] Nov. 29, 1977

[54] MODULAR CONSTRUCTED LOAD SENSING SYSTEM

[76] Inventors: William P. Dybel; Frank R. Dybel, both of 981 Wingate Road, Olympia Fields, Ill. 60461

[21] Appl. No.: 601,326

[22] Filed: Aug. 1, 1975

[51] Int. Cl.² ............................................. G01L 1/16
[52] U.S. Cl. ............................. 73/88.5 R; 73/141 A; 73/DIG. 4
[58] Field of Search .......... 73/141 A, 88.5 R, DIG. 4

[56] References Cited

U.S. PATENT DOCUMENTS

| 2,775,118 | 12/1956 | Legge et al. | 73/88.5 R |
|---|---|---|---|
| 3,169,394 | 2/1965 | Vosteen et al. | 73/88.5 R |
| 3,612,966 | 10/1971 | Dybel | 73/88.5 R |
| 3,680,365 | 8/1972 | Summers | 73/88.5 R |
| 3,884,068 | 5/1975 | Dybel | 73/88.5 R |

*Primary Examiner*—Charles A. Ruehl
*Attorney, Agent, or Firm*—Leydig, Voit, Osann, Mayer & Holt, Ltd.

[57] ABSTRACT

A load monitoring system for indicating and controlling loads intermittently applied to force carrying members, such as pitmans, columns, tie rods, and toggle mechanisms of production presses. The system includes a monitor that has a main circuit board and a plurality of removable and replaceable electronic modules, each module having a base with rows of closely spaced depending pins that are insertable into connectors in the main circuit board to positively secure the module in place and electrically couple its components to the circuit board. The illustrated monitor includes a signal conditioning module which may be calibrated for the press on which the monitor is to be used, after which time it may be used in replacement or modified monitors without the necessity for their recalibration. The system further includes means for manually resetting the overload control contact means following an overload and for automatically overriding this reset after a short period so as to again render operative the load control means even though the reset means is inadvertently or intentionally maintained in its reset position. An overload counter also is provided for counting the overloads and is driven from a DC power supply with a minimum of power consumption.

33 Claims, 7 Drawing Figures

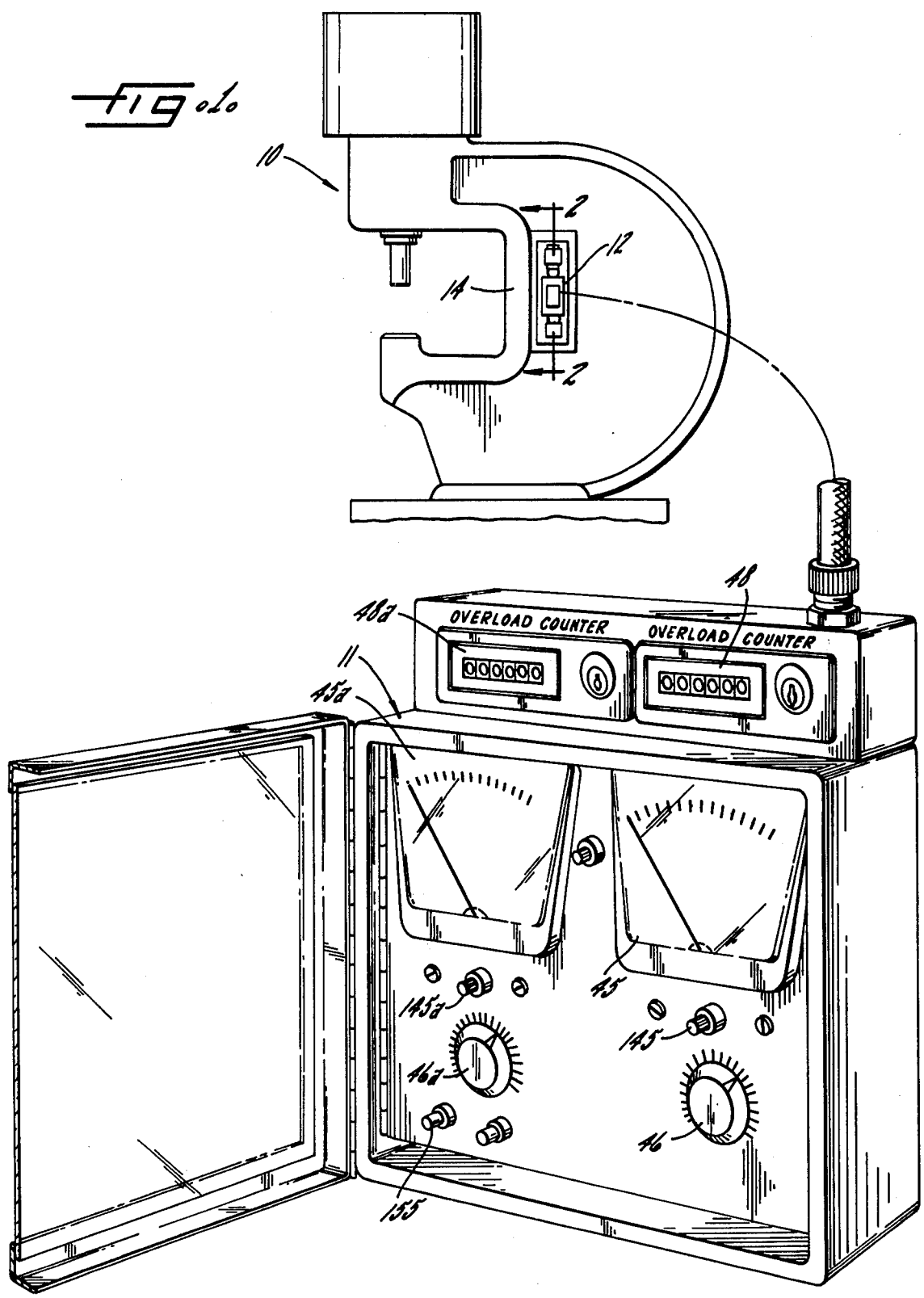

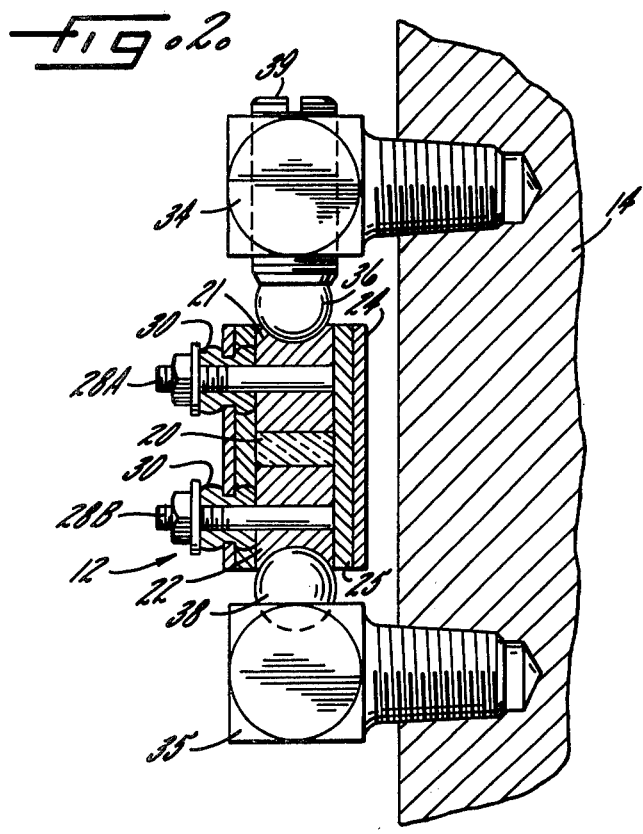
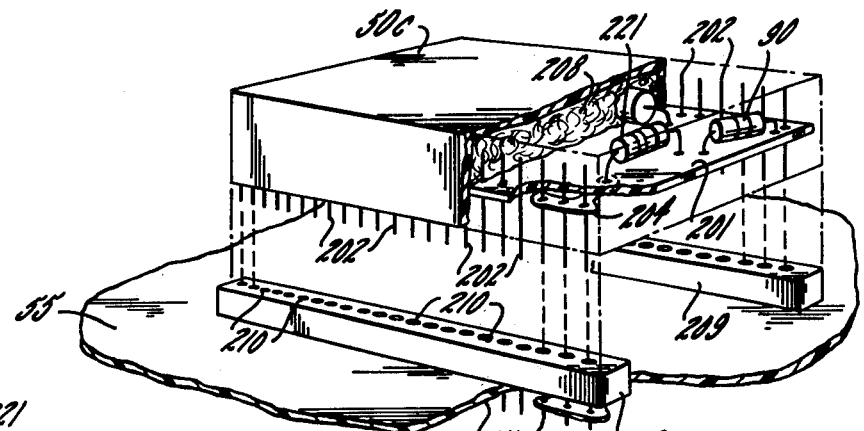
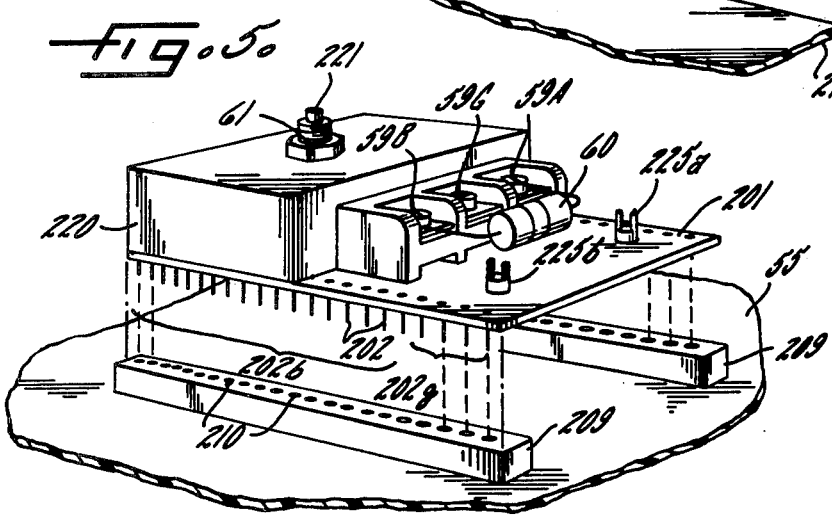

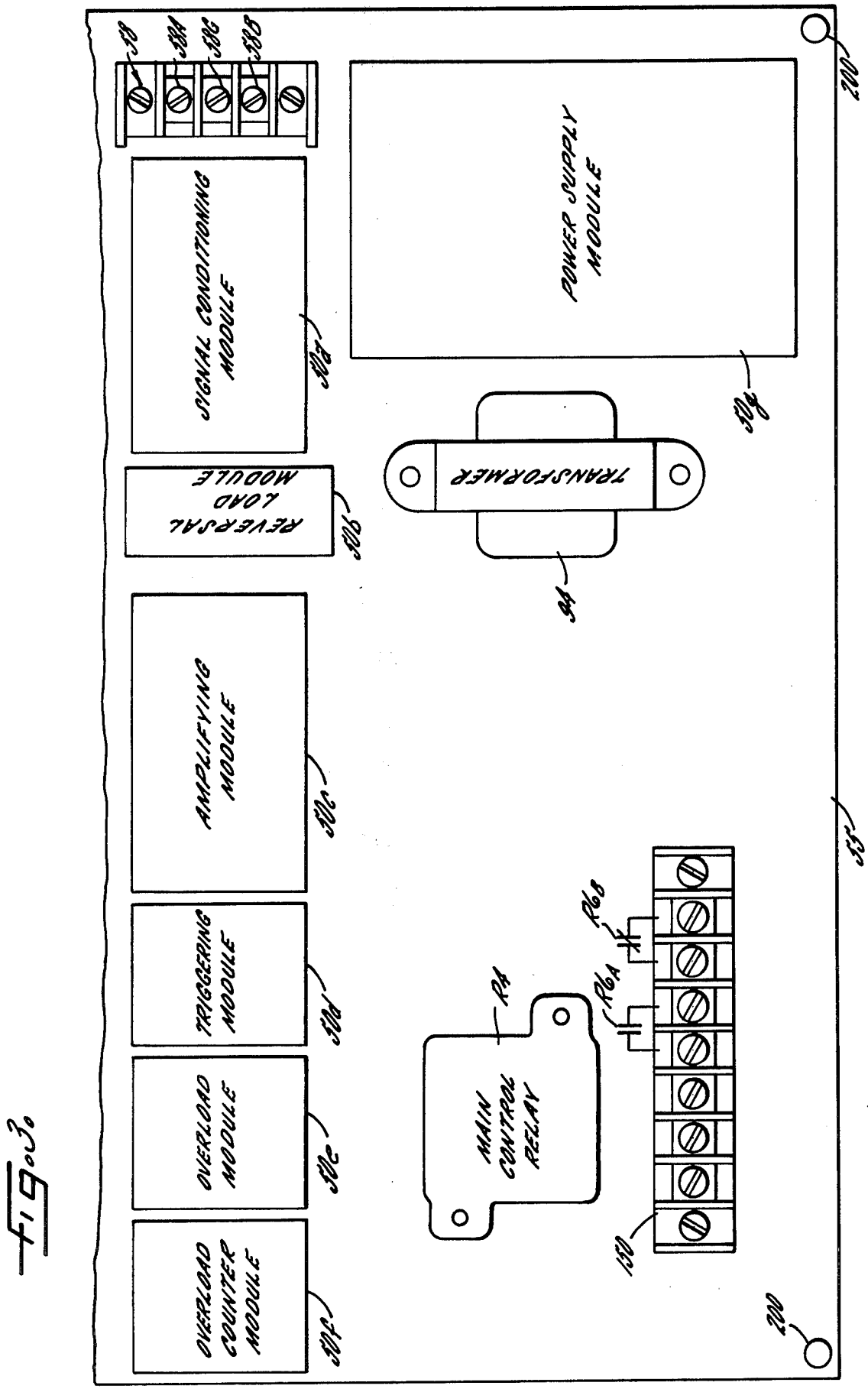

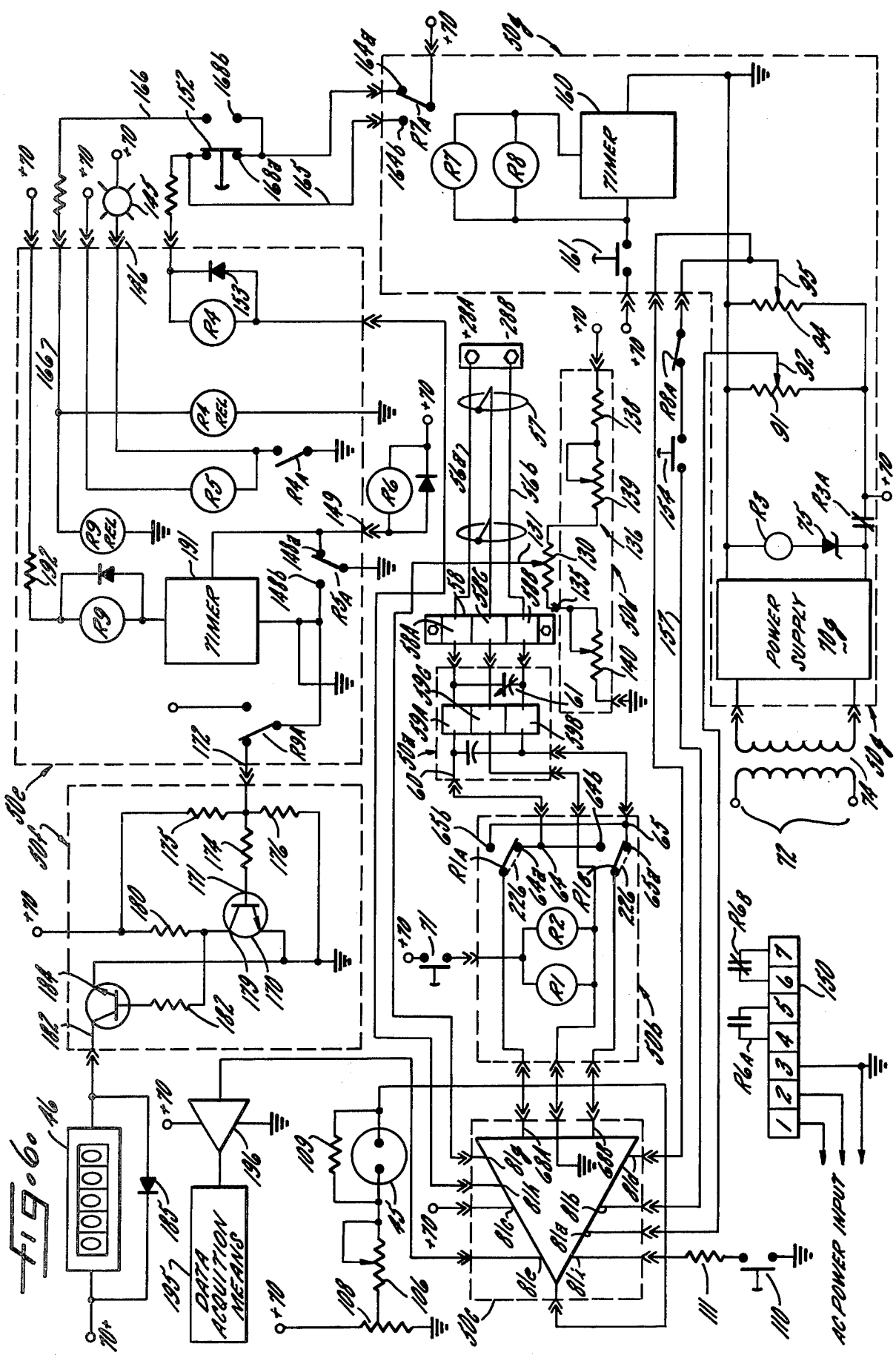

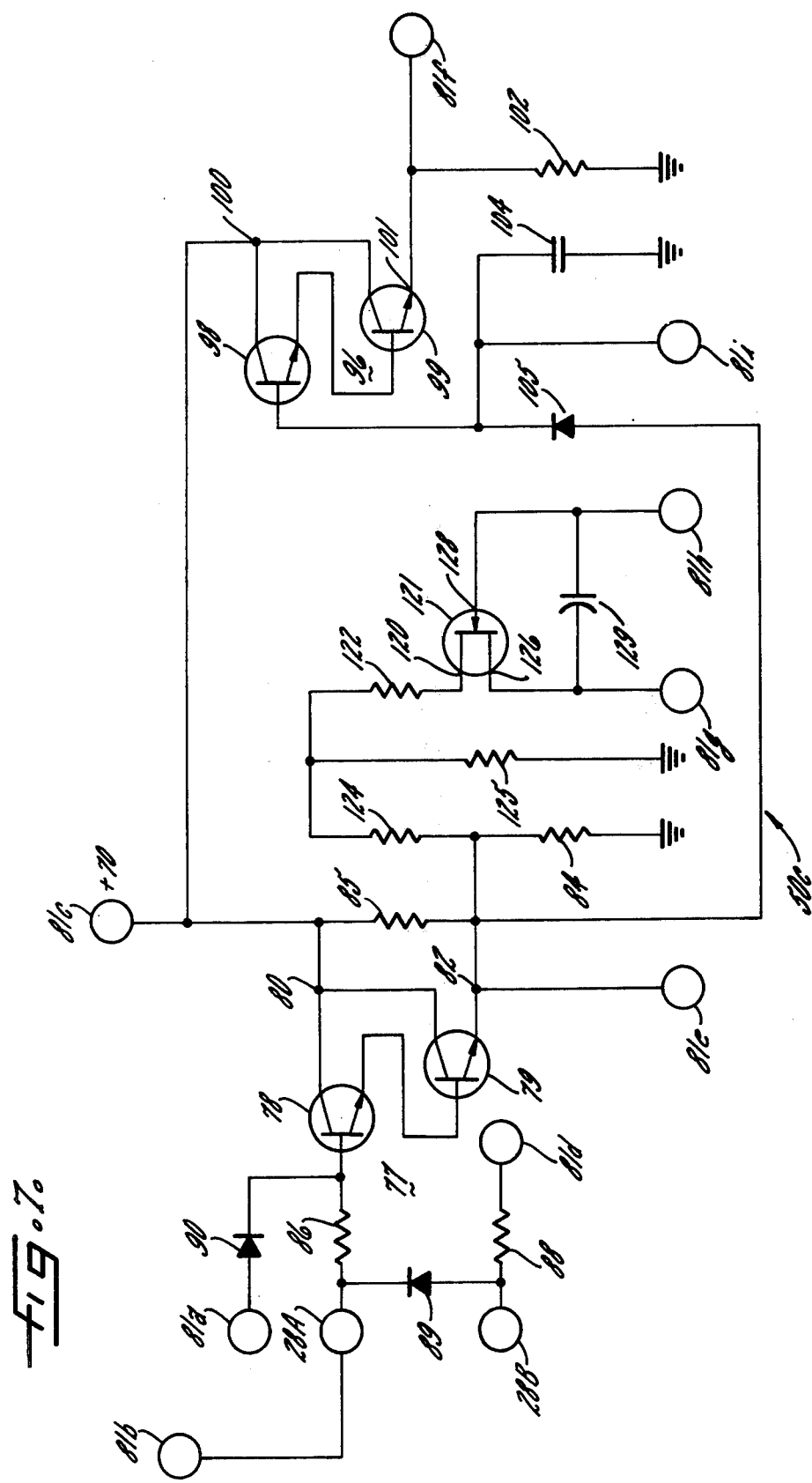

MODULAR CONSTRUCTED LOAD SENSING SYSTEM

DESCRIPTION OF THE INVENTION

The present invention relates generally to load sensing devices, and more particularly to systems for monitoring and controlling the loads on force carrying members, such as the pitmans of production presses.

Load monitoring systems presently are known for indicating the press loads and for automatically shutting off the press if the load incurred by the force carrying member exceeds a predetermined amount. The applicant Frank R. Dybel's U.S. Pat. No. 3,612,966 and copending application Ser. No. 521,466 disclose such load monitoring systems which are operated from signals generated by piezoelectric transducers mounted on the force carrying member. In such systems, it generally has been necessary to calibrate the monitor for the particular press on which loads are to be measured or controlled. These systems are designed with a capacitor in parallel with the piezoelectric transducer for conditioning signals generated by the transducer, and to calibrate the unit, the specific capacitance must be ascertained and installed that will cause a desired output signal to be transmitted to the control circuitry for a given load. Thus, if a capacitance is installed which will condition the transducer output signal so that it will cause the monitor meter to register a 100% load indication when a 100% loading is incurred by the press member, lower loadings similarly will produce signals that generate proportionately lower meter readings.

Heretofore, if a malfunction occurred in the monitor in the above type of system the entire unit generally had to be removed from the press and returned to the manufacturer for repair. Moreover, any replacement unit that was installed, whether permanently or temporarily, similarly had to be calibrated on the press, thereby adding to the cost and inconvenience of the repair. Likewise, if an owner of such a load monitor subsequently desired a monitor with additional safety or operating functions, it again was necessary to substitute an entirely new unit which required calibration even though the same signal generating transducers were utilized.

It is an object of the present invention to provide a more versatile and reliable load monitoring system for force carrying members.

Another object is to provide a load monitoring system of the above kind which permits repair of malfunctions in the field. A related object is to provide a load monitoring system with a modular construction so that individual modules of the electronic control may be easily removed and replaced as necessary.

A further object is to provide a load monitoring system as characterized above which includes a signal conditioning module that may be readily removed from one unit and installed in a new or replacement unit so as to enable the new unit to be used on the press without further calibration.

Still another object is to provide a modular constructed load monitoring system of the above kind with means which both reliably transmit current between the module and a base board upon which it is mounted and which also securely retain the module in mounted position without auxiliary fastening means even under extremely vibratory conditions as exist on punch presses. An associated object is to provide such a modular constructed load monitoring system in which the mounting and current transmitting means tend to resist oxidation, and even if some oxidation occurs, still permit reliable transmission of current.

An additional object is to provide a load monitoring system of the foregoing type with improved failsafe features which more reliably detect malfunctions occurring in the unit.

Yet another object is to provide a load control system for presses which is adapted to prevent shop operators from indefinitely disabling the unit of its control functions.

Other objects and advantages of the invention will become apparent upon reading the following detailed description and upon reference to the drawings in which:

FIG. 1 is a perspective of a load monitoring system of the present invention mounted on a typical punch press which is shown at a reduced scale;

FIG. 2 is a fragmentary section of the stress sensing transducer for the illustrated load monitoring system taken in the plane of line 2—2 in FIG. 1;

FIG. 3 is a plan view of the circuit board and module arrangement of the monitor utilized in the illustrated system;

FIG. 4 is an exploded perspective of the amplifying module and its mounting arrangement with portions broken away;

FIG. 5 is an exploded perspective of the signal conditioning module and its mounting arrangement;

FIG. 6 is an electrical diagram of the monitor; and

FIG. 7 is a more detailed electrical diagram of the amplifying module included in the monitor.

While the invention is susceptible of various modifications and alternative constructions, a certain illustrative embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

Referring now more particularly to FIG. 1 of the drawings, there is shown a typical punch press 10 having a load monitoring system embodying the present invention. The load monitoring system includes a monitor 11 connected to a piezoelectric stress sensing transducer 12 mounted upon a pitman 14 of the press 10. The transducer 12, which may be of a type described in more detail in the applicant Frank R. Dybel's U.S. Pat. No. 3,612,966, includes a piezoelectric ceramic crystal 20 positioned between a top terminal block 21 and a bottom terminal block 22 with the top and bottom faces of the crystal 20 being in contact with and against the surface of each of the respective terminal blocks. As shown in FIG. 2, the terminal blocks 21, 22 and crystal 20 are surrounded by a metallic sheath 24 which serves as a magnetic and electric shield. The sheath 24 is slightly larger than the terminal blocks and crystal to provide space for a surrounding layer 25 of an encapsulating and insulating plastic material. Leading from the terminal blocks through the insulating layer 25 and the metallic sheath 24 are terminals 28A, 28B with suitable connections for attachment of leads. The terminals 28A, 28B and hence the terminal blocks are electrically insulated from the sheath 24 at the passageway therethrough by the terminal insulators 30. The sheath 24 may be grounded to the shield of shielded cables connecting the transducer to the monitor, as will become apparent.

The transducer 12 is mounted on the pitman 14 so that a line normal to the crystal faces at the interfaces between the crystal 20 and the terminal blocks 21, 22 is parallel to and aligned with the stress to be measured in the pitman 14 when under load during a working cycle. The transducer 12 is supported between two points in spaced relation to the pitman 14 to provide what may be characterized as a parallel mechanical circuit for shunting a small portion of the stress in the member 14 to the transducer 12. The transducer in this case is clamped between the ends of two brackets 34, 35 that are screwed into the force carrying pitman 14. The ends of the brackets 34, 35 between which the transducer is clamped are provided with ball and socket joints including balls 36 and 38 that engage sockets in the terminal blocks 21 and 22, respectively. The brackets preferably are electrically insulated from the terminal blocks by the balls 36 and 38 which may be made of a refractory insulating material.

In order to permit desired prestressing of the transducer crystal 20, a set screw 39 is provided in the end of the top bracket 34. After the transducer 12 is in position, the set screw 39 is screwed to secure it under a clamping pressure that places the crystal 20 in a prestressed condition. The amount to which the crystal is prestressed must be sufficient so that it is in a stressed condition under all conditions of loading on the member. In such condition, during the working cycle of the press, the resulting changes in stress on the pitman 14 will act upon the transducer through its support bracketry 34, 35 and cause the piezoelectric crystal 20 to produce relatively high voltage output signals proportional to the stress changes. These electrical signals are transmitted to the monitor 11.

The monitor 11 is adapted to utilize signals generated by the transducer 12 and in this case indicate on a meter 45 the loading incurred by the member in terms of a percentage of its full load rating. In addition, the monitor has a dial 46 which may be set to a specified percentage of the rated load and if that loading is exceeded during any stroke of the press, the press is automatically shut off. A counter 48 also is provided to count the number of overloads that occur. For convenient access and viewing, the meter 45 and dial 46 are mounted in the front face plate of the monitor 11 and counter 48 is positioned directly on top of the unit. The illustrated monitor is of a two point or channel type, having a second meter 45a, dial 46a and counter 48a for indicating and controlling the loading at a second point on the press pitman. Since the second channel is substantially identical to the first, only one will be described in detail.

In accordance with the invention, the monitor has a modular constructed electronic control which facilitates economical manufacture and permits easy field service or modification of the unit. As shown in FIG. 3, the illustrated monitor 11 includes a signal conditioning module 50a, a reversal load module 50b, an amplifying module 50c, a triggering module 50d, an overload module 50e, and an overload counter module 50f. The modules 50 are mounted on a main circuit board 55 in close side by side relation in a straight row substantially in the sequence of their function. A power supply module 50g in the present instance is mounted adjacent the row for supplying regulated and unregulated DC power to the system. Each of the modules 50, as will become apparent, is essential to one or more important operational functions of the monitor and each is easily removable and replaceable.

Referring to FIG. 6, there is shown an electrical diagram of the modules 50 and their interrelation to the overall monitoring system. During a compression or working stroke of the press, an increase in stress on the piezoelectric transducer crystal 20 will generate an output signal at the terminals 28A, 28B of the polarity indicated in FIG. 6. The resulting electrical signal, which is proportional to the stress applied, is transmitted through shielded leads 56a, 56b to terminals 58A, 58B of a terminal block 58 within the monitor 11 and then on to terminals 59A, 59B of the signal conditioning module 50a. The shield 57 for the leads is connected to a ground terminal 58G.

The illustrated signal conditioning module 50a includes a main conditioning capacitor 60 and a trimmer capacitor 61 both connected in parallel across the transducer. While the voltage generated by the transducer 12 is proportional to the stress applied, it is conditioned by the loading effect of the capacitors 60, 61, which may be selected and adjusted during initial installation and calibration of the monitor so that at a full or 100% loading on the press member, a predetermined voltage, such as approximately 10 volts, exits across the capacitors. Since the capacitors 60, 61 are in parallel with the transducer they do not act as an external biasing element so as to reduce the effectiveness of the transducer.

The terminals 59A, 59B of the signal conditioning module 50a are coupled to respective input points 64, 65 of the reversal load module 50b which serves as a coupler between the signal conditioning module 50a and the amplifying module 50c. The reversal load module 50b is adapted to permit selective reversal of the connections between the transducer terminals 28A, 28B and input terminals 68A, 68B of the amplifying module 50c so as to enable monitoring of either increases or decreases in stresses on the force carrying member. For this purpose, the reversal load module input points 64, 65 each have a pair of input contact pins 64a, 64b and 65a, 65b, respectively, associated with a pair of movable contact switches $R1_A$, $R2_A$. In FIG. 6, the contact switches $R1_A$, $R2_A$, are shown engaging pins 64a, 65a, respectively, thereby electrically coupling the transducer terminals 28A, 28B with the respective amplifying module input terminals 68A, 68B. In such condition, the system is adapted to utilize signals generated during an increase in compressive loading on the force carrying member to indicate and control such loading.

For reversing the connection between the transducer terminals 28A, 28B and the amplifier input terminals 68A, 68B in order to measure a decrease in stresses on the load carrying member, as will be discussed in greater detail below, a pair of reed relays R1, R2 are connected in parallel between ground and a regulated DC power supply 70. By manually depressing a push button switch 71, the coils of the relays R1, R2 are energized to move the contact switches $R1_A$, $R2_A$ into contact with pins 64b, 65b. Upon release of the push button switch 71, the coils of the relays R1, R2 are de-energized permitting the contact switches $R1_A$, $R2_A$ to again return to their normal positions at pins 64a, 65a so as to again couple the transducer terminals 28A, 28B to the amplifier module terminals 68A, 68B for monitoring compressive loading during the working strokes of the press.

The regulated DC power supply 70 for the reversal load relays R1, R2, as well as for the remainder of the system, originates at the power supply module 50g. It can be seen that an AC input power source 72 is directed to a voltage reducing transformer 74 which in turn is coupled to the power supply unit 70a on the power supply module 50g. The power supply unit 70a may be of a conventional type adapted to produce a desired regulated DC output 70, such as 24 volts, for use in the system.

To guard the system against substantial unintended increases in voltage from the power supply unit 70a, a relay coil R3 and a Zener diode 75 are coupled in series across the power supply. In the event the output voltage from the power supply unit 70a suddenly increases significantly above the desired preset voltage, conduction will occur in the relay coil R3 and open a normally closed contact $R3_A$ that feeds the regulated DC voltage to the system, thereby shutting off power to the system until the problem is corrected. Alternatively, the relay R3 could energize a buzzer or alarm for indicating the over-voltage.

The amplifying module 50c, which is shown in more detail in FIG. 7, includes an amplifier 77 in the form of a pair of direct-coupled transistors 78, 79 of the NPN variety. In the configuration shown, the transistors form which is commonly called an emitter follower type Darlington pair in that they have their collectors connected together at a point 80 and with the emitter of the first transistor directly attached to the base of the second transistor. The collector connection 80 is tied directly to the positive DC terminal 70 supplied from the power supply module 50g through a module contact point 81c while the emitter terminal 82 constitutes the output terminal for the amplifier 77 and is connected to ground through a loading resistor 84. A stabilizing resistor 85 having a value at least ten times larger than the load resistor 84 connects the output terminal 82 to the positive supply bus 70. Typical silicon NPN transistors presently available may have current amplification factors of 100 or more when properly biased in their linear conductive range. Thus, in cascade, two such transistors will provide an amplification factor of 10,000. The input impedance of the amplifier 77 when properly biased will be approximately 10,000 times the effective load resistance at the emitter terminal 82 which, for present purposes, will be at least 100 kilohms, making the input impedance to the amplifier 77 at least 1,000 megohms. In the illustrated amplifier module 50c, a pair of band pass control resistors 86, 88 are coupled in series with leads from the transducer terminals 28A, 28B and a directional diode 89 is located in parallel across the leads. A diode 90 is connected in a line extending from a bias contact point 81a to the base of the transistor 78 and is poled to allow bias current to flow to the transistor 78.

For biasing the input to the transistors 78, 79 so that they are conductive in their linear range, a first voltage divider 91, located on the power supply module 50g shown in FIG. 6, is connected between the positive DC power supply 70 and ground. The voltage divider 91 is variable through the movement of its wiper arm 92 which in turn is coupled to the bias control point 81a of the amplifying module 50c so as to apply voltage to the base of the transistor 78 via the diode 90. A second voltage divider 94, also in the form of a potentiometer located on the power supply module 50g, has a wiper arm 95 coupled to a contact point 81d of the amplifying module for establishing a reference voltage substantially equal to the bias voltage at the base of the first transistor 78. The transducer 12 is part of a branch that includes the transducer 12 itself, the band pass control resistor 86, 88 in series with the transducer, and the conditioning capacitors 60, 61 and directional diode 89 in parallel with the transducer. With the voltages at the opposite ends of the transducer branch being equal in the static condition, zero current will flow through the transistor while in its inactive condition.

The output of the amplifier 77 in the present instance is connected to a second amplifier 96 for operating the indicator meter 45. The amplifier 96 again is a Darlington arrangement of direct coupled transistors 98, 99 having their collectors at a common point 100 and with the emitter of the first transistor attached to the base of the second transistor. The collector connection 100 is tied to the positive DC supply terminal 70 while the emitter terminal 101 constitutes the output terminal for the amplifier 96 and is connected to ground through the resistor 102. The output terminal of the amplifier 96 also is coupled to the module contact point 81f to which the meter 45 connects. Current flowing from the amplifier 77 charges a capacitor 104 connected in a line extending from the input of the transistor 98 to ground. A diode 105 is included in the input line to the amplifier 96 to prevent reverse current flow from the capacitor 104.

For properly calibrating the meter 45 for maximum and minimum readings, the output terminal of the meter is connected to a variable resistor 106, shown in FIG. 6, which in turn is coupled to the wiper of a potentiometer 108 connected between ground and the positive supply terminal 70. A dampening resistor 109 in this case is connected in parallel with the meter 45.

It will be seen that the meter 45 will register the compressive loadings on the press pitman during successive working strokes. When an increase in compressive stresses occurs on the piezoelectric transducer 12 during the stroke of the press, the piezoelectric crystal 20 produces a voltage proportional to the stress applied. This voltage is limited or conditioned by the capacitors 60, 61 of the signal conditioning module 50a so that its full load output is approximately 10 volts. As a result, a positive polarity results at the amplifier input terminal 68A, and as the voltage across the transducer rises, the output voltage from the amplifier 77 also rises in a 1 to 1 ratio. The output from the meter amplifier 96 again will be proportional to the stress communicated to the transducer 12 and will cause the meter 45 to indicate the appropriate loading, in this case as a percentage of the rated loading for the press member. Current flowing from the amplifier 77 charges the capacitor 104 so as to provide a sufficiently prolonged voltage to maintain a current flow through the amplifier 96 and meter 45 to obtain the necessary meter reading. To permit quick unloading of the capacitor 104 to ground and quick return of the dial of the meter 45 to zero if desired, a reset button 110 is connected in series with a resistor 111 in a line coupled between ground and a reset terminal 81i of the amplifying module which in turn is coupled to the input of the amplifier 96.

For the purpose of controlling overloading of the press force carrying member 14, the output terminal 82 of the amplifier 77 also is coupled to the gate terminal 120 of a control rectifier 121 through an input resistance 122 and a voltage divider consisting of resistors 124 and 125. The control rectifier 121, typically a silicon device designated as an SCR, is rendered conductive when the voltage at the gate terminal 120 exceeds the reference voltage at the cathode terminal 126 by a fixed amount.

The cathode and anode terminals 126, 128 of the illustrated rectifier 121 are connected to respective module output contact points 81g, 81h with a condensor 129 coupled therebetween.

The SCR 121 is selectively controllable by the triggering module 50d which is coupled to the amplifying module 50c through a potentiometer 130 that has a wiper arm 131 connected to the cathode 126 of the SCR 121 through the contact point 81g and is selectively movable by the control dial 46 mounted on the face plate of the monitor. The potentiometer 130 is connected to the triggering module through contact points 134, 135 and forms one part of a voltage divider 136 connected between ground and the positive supply terminal 70 which divider also includes a fixed resistor 138, a "coarse" control rheostat 139 and a "fine" rheostat 140.

The control rectifier 121, as indicated above, will become conductive when the voltage at the gate terminal 120 exceeds the reference voltage at the cathode terminal 126 by the fixed amount. Once the rectifier begins conducting, it will remain conducting so long as the current flowing through the anode-cathode junction remains sufficiently high. In the present instance the forward current of the rectifier 121 is limited by the resistance of the lower branch or leg of the potentiometer 130, together with the resistance of the trigger module rheostat 140. The threshold voltage at which the rectifier will trigger, therefore, can be established by the reference voltage divider 136 and the gate voltage divider consisting of resistances 124 and 125. Since the potentiometer 130 can be manually adjusted by means of the hand dial 46, it permits the user to easily choose a setting, and thus the loading on the press member, that causes the SCR 121 to be rendered conductive.

The overload module 50e includes an overload relay R4 that is coupled to the cathode terminal 126 of the SCR through the amplifying module contact point 81h so as to be energized when the SCR is rendered conductive.

Energization of the overload relay R4 in turn is utilized to activate overload indication and control means. In the illustrated overload module 50e, when the load exceeds the setting of the dial 46, a contact $R4_A$ is closed in response to current flow through the overload relay R4 to energize an overload light 145 coupled between the DC power supply 70 and ground through a contact point 146 on the overload module. The light 145 in this case is mounted on the face plate of the monitor so as to immediately signal when an overload has occurred.

For automatically shutting off the press upon such overload, a relay R5 also is energized upon closure of the contact $R4_A$. Energization of the relay R5 in turn causes contact $R5_A$ to be moved from contact point 148a to contact point 148b which de-energizes a main control relay R6 coupled to the overload module 50e at contact point 149. De-energization of the main overload relay R6 opens the main clutch control relay switch $R6_A$ for the press to immediately shut down its operation. De-energization of the main control relay R6 also closes an auxiliary relay $R6_B$ which may be utilized to energize auxiliary overload control means such as a sound device or a control that stops the flow of production stock to the press. The contacts $R6_A$ and $R6_B$ in this case are located on a terminal block 150 to which the press clutch control and the auxiliary overload control means may be coupled.

To de-energize the overload relay R4 after it has been activated by an overload, a normally closed reset push button switch 152 is connected in series with the power supply 70, the relay R4 and the SCR 121, and upon depression of the switch 152 the circuit is opened. A diode 153 is connected in parallel with the energization coil of the overload relay R4 and is poled to dissipate the stored charge on the coil at turn-off and to limit the reverse voltage buildup across the coil. The speed at which the overload relay R4 de-energizes is further increased by the condensor 129 connected across the anode and cathode terminals of the rectifier 121. In addition, a normally open, input reset button 154 is provided in a line 157 coupled between the wiper 95 of the biasing potentiometer 94 and the terminal 28B of the transducer through amplifying module contact point 81b. Depression of the input reset button 154 in effect shorts the transducer terminals 28A, 28B and to dissipate the charges on the capacitors 60, 61 that feed the indicator meter 45. It will be understood that the input reset switch 154, the overload reset switch 152, and the meter reset switch 110 all may be mechanically coupled so as to be simultaneously activated, such as from a button 155 on the face of the monitor 11.

Heretofore, some practical problems have resulted from resetting of overload control equipment, such as the type in the above referenced copending application of applicant Frank R. Dybel. If the press is repeatedly overloading so that the monitor persists in shutting off the press, the operator—who often is more concerned about continued production than the costly problems that result from overloading—sometimes becomes irritated and will attempt to disable the unit by holding in the reset button. This has been done by taping down the reset button or otherwise holding it in its depressed condition, such as by placing a block of wood against it. In the past, these tactics have been successful in disabling the control function of the equipment.

In carrying out the present invention, reset override means are provided to prevent prolonged disabling of the overload control function of the monitor by continued depression of the reset buttons. To this end, a timer 160, in this case mounted on the power supply module 50g, is connected to the power supply 70 by a reset timer switch 161 which is closed simultaneously with the overload and input reset switches 152, 154. The timer 160, which may be of a conventional delay on type, is adapted to energize relays R7, R8 coupled across the timer after a predetermined relatively short period, such as four seconds, following closure of the reset timer switch 161. Energization of the relay R7 causes a contact switch $R7_A$ to be moved from its normal pole position engaging contact 164a to contact pin 164b so as to re-couple the overload relay R4 and SCR 121 to the power supply 70 through a bypass line 165 around the overload reset switch 152, thereby again rendering the SCR 121 functional.

Activation of the timer 160 also is effective to override the input reset switch 154. For this purpose, the relay R8, which similarly is energized by the timer 160 after the predetermined short period following closure of the overload, input, and timer switches 152, 154, 161, respectively, opens a contact $R8_A$ in the input reset line 157 so as to interrupt the short circuit across the transducer that occurs upon closure of the reset switch 154. Thus, even though the overload reset switch 152 is pushed in to initially de-energize the SCR 121 and the overload relay R4 and short circuit the transducer through closure of the input reset 154, after the predetermined period governed by the timer 160 the system will again be completely functional even if the reset button switches 152 and 154 are not released.

Another problem that has been encountered in the use of prior load monitoring equipment is that following an overload the operator may simply unplug the monitor. In such case, when the unit is later plugged in, such as by the operator on the next shift, there is no indication that an overload had ever existed.

According to still another feature of the invention, memory means is provided so that if the monitor is unplugged following an overload, the overload indication light will still be illuminated once the unit is subsequently again plugged in to the electrical source, thereby notifying the subsequent operator that use of the monitor had been discontinued following an overload. For this purpose, the relay contact $R4_A$ is a magnetic latching type which will remain closed following energization of the overload relay R4 until a releasing relay $R4_{rel}$ is energized. For energizing the releasing relay $R4_{rel}$ to open the magnetic relay contact $R4_A$, the releasing relay $R4_{rel}$ is in a line 166 which is coupled to the DC power supply 70 through the overload reset push button switch 152 upon depression of the switch 152. It will be seen that upon depression of the reset switch 152 the switch is moved away from the contact point 168a, de-energizing the overload relay R4, and into contact with point 168b connecting the releasing relay $R4_{rel}$ to the power supply 70.

Thus, in the usual case when an overload occurs, the overload relay R4 will be energized through conduction of the SCR 121 causing closure of the magnetic latching switch $R4_A$ which in turn causes the overload light 145 to be illuminated. Upon depression of the overload reset override button 152, the overload relay R4 is de-energized and contact point 168b is coupled to the power supply energizing the releasing relay $R4_{rel}$ and again opening the magnetic contact $R4_A$. However, in the event that following an overload the press operator decides to merely unplug the monitor 11, it will be seen that the magnetic switch $R4_A$ remains closed since the overload reset button 152 has not been depressed. When the unit is later again plugged in the overload indication light 145 will again be illuminated, indicating to the subsequent user that an overload had existed at the time the previous operator discontinued use of the monitor. Also, the press cannot be operated until the reset button 152 is pushed.

In further carrying out the invention, means are provided for driving the overload counter from the DC power supply to count each overload with a minimum of power consumption. For this purpose, the overload counter module 50f includes a first transistor 170, the base 171 of which is coupled to a contact point 172 on the overload module 50e through an input resistor 174 and a voltage divider comprising resistors 175 and 176 connected between the DC power supply 70 and ground. The three resistors 174, 175, 176 are coupled to a common point 178. The collector terminal 179 of the transistor is connected to the power supply 70 through a resistor 180 and to the base of a second transistor 181 through a resistor 182. The counter 46 is connected in series between the collector terminal 182 of the transistor 181 and the power supply 70 and the emitter terminal 184 of the transistor is connected to ground. The counter 46 is mounted on the monitor 11 and may be a conventional type that will advance one-half a digit upon being energized and will advance the remaining half upon de-energization. A diode 185 in this case is mounted in parallel with the counter 46.

During normal operation of the press the overload counter is in a de-energized state. In such condition, current from the power supply 70 flows through the counter current voltage divider 175, 176 creating a sufficient voltage at the base of the transistor 171 to render the transistor conductive thereby drawing the collector terminal 179 effectively down to zero potential to prevent current flow to the second transistor 181.

Upon an overload and the resulting closure of relay $R4_A$ and energization of relay R5, the contact switch $R5_A$ is moved away from contact point 148a to contact point 148b which not only de-energizes the main control relay R6, as previously discussed, but also grounds the voltage divider point 178 through a normally closed contact $R9_A$. Such grounding of the point 178 lowers the voltage potential at the base 171 of the transistor 170 to such level that the transistor becomes non-conductive, which in turn increases the voltage at the cathode terminal 179 to cause a current flow through the resistor 182 and transistor 181. Such conduction of the transistor 181 in effect grounds its collector terminal 181 to permit conduction from the DC power supply 70 through the overload counter 46 which advances the counter one-half digit. During this time, the counter draws significant current, such as 500 milliamperes.

To de-energize the overload counter 46 after a relatively short period in order to conserve on power consumption from the DC power supply and to cause the counter to digitize the remaining one-half digit following the overload, the overload module 50e has a timing circuit 190. The timing circuit 190 includes a timer 191 of the conventional delay on type connected in series with a relay R9 and resistor 192 between the DC power supply 70 and the contact switch $R9_A$. When the contact switch $R5_A$ is moved to contact point 148b in response to an overload, the timer 191 will delay for a predetermined short period, such as one second, energization of the coil of relay R10 thereby allowing the overload counter 46 to be energized, as discussed above, to advance the first half digit. After the one second period, the timer 191 permits conduction through the relay R9 which is then energized to open contact $R9_A$ and interrupt the grounding of the voltage divider point 178 and again raise the voltage at the base 171 of the first transistor 170 to a sufficiently high level to render it conductive. Such conduction of the transistor 170 again lowers the voltage at the cathode terminal 179 which terminates current flow to the second transistor 181 de-energizing the overload counter 46. The relay switch $R9_A$ preferably is of a magnetic latching type which is held in an open condition until the overload reset 152 is depressed at which time a releasing relay $R9_{rel}$ coupled to line 166 is energized to again close contact switch $R9_A$. As explained previously, depression of the overload reset button 152 will simultaneously release and open the latching relay switch $R4_A$ de-energizing the relay R5 and permitting relay control $R5_A$ to return to its normal position engaging contact 148A. It can be seen, therefore, that the timing circuit 191 enables the counter to effectively count the overload with a relatively small amount of power being consumed from the power supply and such counting is effected even though the overload is not immediately observed by the operator and the overload reset button 152 is not depressed until sometime later.

For providing a permanent record of the loading versus time on the press member, a data acquisition means 195 in this case also is coupled to the output of the amplifier 77. The data acquisition means 195 can be a recorder or an oscilloscope of a known type that will record in relation to time the amplitude of the transducer output signals which are representative of the magnitude of the loading incurred by the press member. In the illustrated embodiment, the data acquisition means 195 is connected to contact point 81e of the amplifying module 50c through a booster amplifier 196.

The foregoing has described the load indication and limiting capabilities of the monitor 11 during compressive loading of the press member, such as occurs during the working stroke. Upon completion of the working stroke, however, and particularly when the workpiece is sheared, there often results a snap back action that creates a tension or reverse force in the member. The resulting reduction in stress on the transducer, as in the case of an increase in stress, generates an output signal in proportion to the stress change, although of opposite polarity.

To indicate and control such reverse loadings, the push button switch 71 for the reversal load module 50b may be depressed so as to energize relays R1, R2 moving contact switches $R1_A$, $R2_A$ to contact pins 65b, 64b, respectively. Such switching thereby reverses the connections between the transducer terminals 28A, 28B and the input terminals 68A, 68B of the amplifying module 50c so that an output signal from a decrease in stress on the press member can be utilized by the monitor.

After the contact switches $R1_A$, $R2_A$ have been moved to such reverse load position at contact points 65b, 64b, it can be seen that during the working stroke of the press when the pitman is compressed, a positive charge again would be generated at the transducer terminal 28A, but in this case, that terminal would be connected to the amplifier terminal 68B and the diode 89 would short the signal so as to prevent an energy buildup in the capacitors 60, 61 or current flow to the amplifier 77. In such case, after the end of the working stroke, the polarity of the transducer terminals 28A, 28B will reverse due to the reduction in stress so that the terminal 28B becomes positive. As the pitman returns to its uncompressed condition, the transducer will cause a voltage buildup in the capacitors 60, 61 and current will flow from the transducer terminal 28B through the reversal load module 50b and to the amplifier input terminal 68A. When the press pitman has reached a completely uncompressed state, the voltage in the capacitors 60, 61 in the usual case is the same as the voltage that results during the working stroke. Since the pitman generally goes into tension following breakthrough of the workpiece or during stripping of the workpiece from the punch, the continued reduction in stress on the transducer crystal 20 will produce a still greater voltage in the capacitors 60, 61. While such tensional forces generally do not exceed 15% of the direct compressive loading, they can nevertheless be as damaging to the press. Thus, if it were desired to limit the tension forces to such levels, i.e., 15% of the compressive force loading, the dial 46 would be set to 115% of the rated load.

Since press operators are usually most concerned about compressive loading, the reversal load push button switch 71 preferably may be spring biased to an open position so that the reversal loadings are monitored only when the push button 71 is depressed. Upon release of the button 71 it returns to an open position de-energizing the relays R1, R2 allowing the contact switches $R1_A$, $R2_A$ to return to their original positions at contact pins 64a, 65a for transmitting signals from increases in stress on the member to the amplifying module 50c.

Referring now to FIGS. 3-5, the construction of the individual modules 50 and their installation on the circuit board 55 are shown in more detail. The circuit board 55 in this case is made of a copper coated glass malemine with the coating etched away or removed in a known manner to leave a printed circuit of the desired design on the underside thereof for electrically coupling the modules 50 and the other components mounted on the board 55. To permit easy mounting of the circuit board 55 within the monitor 11, the corners each are formed with a mounting apertures 20D. The terminal blocks 58, 150, and the transformer 94 in this case are rigidly secured to the board 55, such as by screws. The main control relay R4 for the press clutch control may be of a conventional type that has a pronged casing for plugging into suitable apertures in the circuit board 55.

In keeping with the invention, the modules each have means that facilitate their secure but removable mounting on the circuit board as well as insure reliable electrical coupling therebetween. To this end, each module 50 has a flat base 201 with parallel rows of closely spaced round mounting and conductive pins 202 protruding from the underside thereof along at least two opposite sides. The specific module construction is depicted in FIG. 4, which for illustrative purposes shows the amplifying module 50c with a portion broken away. The module base 201, like the main circuit board 55, is made of copper coated melamine formed with a predetermined circuit layout 204 on its underside. Electrical elements, such as the SCR 121 and diode 90 shown, are mounted on the base 201 and electrically coupled, such as by soldering, to appropriate conductive lead lines of the module circuit 204. The mounting pins 202 are made of a sturdy conductive material, and preferably have a gold flash coating adapted to resist or minimize oxidation. The pins 202 extend perpendicularly through the base 201 and preferably are soldered in place. In the illustrated amplifying module 50c, the pins not only extend below the base, but a portion of each pin extends above the base.

To enhance conduction between the module base 202 and the main circuit board 55, each input and output lead of the module base is connected to a plurality of the pins 202. For this purpose, the pins are of relatively small diameter, such as less than 0.04 inches and are spaced at intervals of less than ¼ of an inch. In practice, pins of 0.023 inches in diameter located at 1/10 of an inch spacing have been found preferred. In the illustrated embodiment, it can be seen that the SCR 121 is coupled to a conductive lead line of the base circuit 204 which in turn connects with four of the pins 202. The diode 90 similarly is shown coupled to a plurality of pins at the opposite side of the board 202. The number of pins 202 for each output lead may vary usually between about 2 and 8, depending upon the criticality of the electrical element to which the lead connects, the magnitude of the signal it receives, and the likelihood of oxidation or contamination at that point. Thus, in instances where a low voltage signal must be transmitted, or where oxidation or foreign matter might impede current flow, a greater number of pins preferably should be utilized to insure reliable electrical conduction. In other instances, such as where relatively high voltage signals are transmitted, a lesser degree of ganging of the pins may be required.

After the pins 202 have been mounted and soldered in place in the module base 201, the underside of the base may be coated with a thin layer of epoxy to more securely hold the pins in place and to seal the bottom of the circuit board. Where access to the electrical components of the module is not required, as in the case of the amplifying module, the upper side of the module may be encapsulated within a rectangular block of epoxy 208 to provide a neat composite appearance. Such encapsulation not only tends to protect the electrical components from contamination or damage, but also further rigidifies the secure mounting of the pins 202.

To facilitate mounting of the modules 50 on the main circuit board 55, connector strips 209 are mounted in spaced parallel relation on the board 55. The connector strips 209 are formed with a plurality of sockets or apertures 210 spaced in corresponding relation to the module pins 202 for receiving the pins. The connector strip sockets each have a conductive contact which terminates in a pin 211 extending through the underside of the connector strip, and these pins 211, in turn, are positioned through suitable small apertures in the circuit board 55 and are soldered together on the underside of the board in groups corresponding to the grouping or ganging of the pins 202 for each module lead. The leads on the printed circuit board 55 may thereby be coupled to respective module component leads through the connector strips 209 and module pins 202 positioned therein.

Such rows of closely spaced pins 202 have been found to facilitate exceptionally rigid and secure mounting of the modules 50 on the circuit board 55, but yet permit their easy removal and replacement. Even when the monitor 11 is subjected to extreme vibratory conditions, as often exist on punch presses, the modules 50 have been found to remain securely in their mounted positions without the need for auxiliary fastening means. Moreover, as indicated above, the ganging of the pins 202 permit reliable electrical coupling between the modules 50 and the main circuit board 55.

Referring to FIG. 5, the signal conditioning module 50 is shown in more detail. The signal conditioning module similarly includes a base 201 with a printed circuit and rows of depending mounting and conductive pins 202. The terminals 59A and 59B in this case are of a known clamp type located on the top of the module base 201, and the capacitor 60 is shown coupled between the terminals. A ground terminal 58G is located between the terminals 59A, 59B. The trimmer capacitor 61 also is electrically coupled in parallel to the terminals 59A, 59B through the printed circuit 204 (not shown in this case) of the module base 201. For protecting the trimmer capacitor 61 against moisture and contamination which otherwise might affect its relatively movable parts, it is contained within a rectangular enclosure 220 located adjacent the clamp terminals 59A, 59B. To permit adjustment of the trimmer capacitor 61 during installation of the equipment, its upper end extends through the enclosure 220 and has a slot 221 for a screwdriver.

Since the signal conditioning module 50a receives signals directly from the transducer 12 and conditions these signals for use throughout the load indication and control electrical systems, it is important that the signals be transmitted to the signal conditioning module as accurately as possible. For this purpose, the signal conditioning module terminals 59A, 59B are coupled to the main circuit board 55 through an even greater number of coupling and conductive pins 202. In the illustrated embodiment, the terminal 59B is coupled through an appropriate lead of the printed circuit of the module base 202 to 18 pins, designated 202b in the drawing. The terminal 59A can be coupled to a similar number of pins on the opposite side of the base. The ground terminal 58G in this case is coupled to 8 pins, four of which are designated 202g on one side of the base, and four on the opposite side of the base.

The size of the capacitor 60 generally is determined in the field when the monitor is initially installed on the press. The power supply module 50g, amplifying module 50c, triggering module 50d, and overload module 50e, on the other hand, can be manufactured and preset such that when a predetermined voltage, such as 10 volts, is applied to the amplifying module, a 100% rating will be indicated on the meter 45. When the monitor 11 is installed on a press, therefore, the size of the capacitor 60 and the adjustment of the trimmer 61 must be ascertained so that at full loading on the press member the signal conditioning module 50a conditions the transducer signal to the voltage, i.e., 10 volts, that effects the 100% meter reading.

To facilitate the selection of the proper fixed capacitor 60 during the initial installation, a pair of terminal posts 225a, 225b are mounted in upstanding relation on the base plate 201 of the signal conditioning module 50a to one side of the terminals 59A, 59B. The posts 59a, 59b again can be electrically coupled to the respective terminals 59A, 59B through the printed circuit of the base 201. After the transducers have been installed on the press and the monitor electrically connected thereto, a capacitive switching device of a known type may be attached across the terminals 225a, 225b to determine the specific capacitance, together with the adjustment to the trimmer 61, that will produce the necessary output signal to the amplifying module to achieve a reading on the meter 45 corresponding to the known loading on the press member. Once that amount of capacitance has been ascertained, the capacitor switching device may be disconnected from the terminals 225a, 225b and a capacitor 60 of the determined size may be easily installed across the terminal clamps 59a, 59b. Alternatively, the capacitor 60 could be welded across the terminal posts 225a, 225b, if desired.

It will be understood by one skilled in the art that such a removable and replaceable signal conditioning module 50a can greatly facilitate service and modification of the monitor 11 in the field and eliminate costly recalibrations. For example, if a malfunction occurred in the monitor 11, other than with respect to the signal conditioning module 50a, and it was necessary to replace the monitor on the press, a new monitor without a signal conditioning module 50a could be shipped to the customer. The customer could then merely remove the signal conditioning module 50a from the detective unit and plug it into the new unit. Since the new unit, as in the case of the old monitor, would be manufactured such that a 100% meter reading resulted at the designated 10 volt signal to the amplifying module 50c and the signal conditioning module 50a has already been calibrated to properly condition the transducer signals at known loadings, it can be seen that no field calibration would be necessary for the new unit. Not only does this eliminate the substantial cost of the field calibration, but it also enables the new unit to be immediately available for use without the delay of scheduling a service call. Likewise, if the press owner had a monitor that had only load indicating capabilities and subsequently desired a monitor, such as the type disclosed in the present application, which also controls overloads, the signal conditioning module from the indicator could be removed and used in the new unit, again without recalibration.

While the advantages of such a removable and replaceable signal conditioning module 50a are significant, the other modules 50 of the monitor 11 likewise have practical and economical advantages. For example, the monitor 11 might be initially installed without a reversal load module 50b. In such case, jumper leads 226, shown in phantom in FIG. 6, could be coupled to the respective terminals 64a, 65a so that only signals generated by increases in compressive loadings on the press member would be transmitted to the amplifying module 50c. If the press owner subsequently wished to modify the unit to also monitor reverse loadings, it would simply be necessary to sever the jumper leads 226 and obtain and plug in the reversal load module 50b.

The use of separate and removable amplifying module 50c also is desirable since the amplifiers are probably the components of the electrical systems most vulnerable to failure. The removable module 50c permits easy field replacement. The power supply module 50g also tends to have a relatively high failure rate, and its removability similarly facilitates repair and replacement. The removable trimmer module 50d also enables it to be easily returned to the factory with a power supply to insure proper adjustment of the biasing potentiometers. Thus, it can be seen that the modular construction of the monitor can both eliminate costly calibrations that have heretofore been necessary in the replacement and modifications of such load indication equipment, as well as facilitate and minimize the necessity for field service.

We claim as our invention:

1. A system for monitoring loads that are intermittently applied to a force carrying member comprising mounting means fixed to said member substantially in line with the load to be detected, a transducer interposed between said mounting means and having a pair of output terminals with a piezoelectric crystal therebetween for developing at said output terminals electrical signals substantially proportional to the stresses experienced by to said member, electrically operated means responsive to said transducer signals for monitoring the loading on said member, said monitoring means including a main circuit board and a plurality of individual modules each containing at least one electrical component, means for engaging each said module with said board as an incident to positioning of said module at a predetermined location on said board, said engaging means including a plurality of mounting and conductor pins extending from the underside of each said module for electrically coupling said modules and the components thereon to said circuit board when said modules are in mounted position, and said modules each being individually removable from said circuit board.

2. The load monitoring system of claim 1 including an amplifying module having a pair of input terminals and amplifying means driven by said transducer signals to produce an output signal proportional to said transducer signals, means including a pair of disconnectable jumper leads connecting said amplifier module input terminals to said transducer terminals, and a reversal load module mountable on said circuit board for coupling said amplifying module terminals to said transducer terminals upon disconnection of said jumper leads, said reversal load module including switch means for selectively reversing the electrical connection between said amplifier module input terminals and said transducer terminals.

3. A system for monitoring loads that are intermittently applied to a force carrying member comprising mounting means fixed to said member substantially in line with the load to be detected, a transducer interposed between said mounting means and having a pair of output terminals with a piezoelectric crystal therebetween for developing at said output terminals electrical signals substantially proportional to the stress experienced by said member, electrically operated means responsive to said transducer signals for monitoring the loading on said member, said monitoring means including a main circuit board and a plurality of individual modules each containing at least one electrical component, means for engaging each said module with said board as an incident to positioning of said module at a predetermined location on said board, said engaging means including conductive means for electrically coupling said modules and the components thereon to said circuit board when said modules are in mounted position, said modules including a signal conditioning module formed with a capacitance means electrically coupled in parallel with said transducer terminals when said signal conditioning module is mounted on said circuit board, said signal conditioning module capacitance means being effective to limit the transducer output signal to a predetermined voltage for a given loading on said force carrying member, and said modules each being individually removable from said circuit board.

4. The load monitoring system of claim 3 in which said signal conditioning module includes a first pair of terminals on an upper side of said module, and said capacitance means includes a first capacitor and a variable trimmer capacitor which both are electrically connected across said first terminals.

5. The load monitoring system of claim 4 in which said signal conditioning module has a base, and means on said signal conditioning module base substantially enclosing said trimmer capacitor, and said trimmer capacitor having a portion extending through said enclosure to permit its adjustment.

6. The load monitoring system of claim 5 including a second pair of terminals mounted in upstanding relation on said signal conditioning module base and electrically coupled in parallel to said trimmer capacitor.

7. A system for monitoring loads that are intermittently applied to a force carrying member comprising mounting means fixed to said member substantially in line with the load to be detected, a transducer interposed between said mounting means and having a pair of output terminals with a piezoelectric crystal therebetween for providing at said output terminals electrical signals substantially proportional to the stresses experienced by said member, electrically operated means responsive to said transducer signals for monitoring the loading on said member, said monitoring means including a main circuit board and a plurality of individual modules each containing at least one electrical component, said modules including an amplifying module and a reversal load module, means for engaging each said module with said board as an incident to positioning of said module at a predetermined location on said board, said engaging means including conductive means for electrically coupling said modules and the components thereon to said circuit board when said modules are in mounted position, said amplifying module having a pair of input terminals, and including amplifying means driven by said transducer signals to produce an output signal proportional to the transducer signal, said reversal load module being adapted to couple said amplifying module input terminals to said transducer terminals, said reversal load module including switch means for reversing the connection between said transducer terminals and said amplifying module input terminals for enabling said monitoring means to selectively monitor increases or decreases in loads on said member, and said modules each being individually removable from said circuit board.

8. The load monitoring system of claim 7 including means for selectively actuating said reversal load switch means, said actuating means including relay means on said reversal load module, and means for selectively energizing said relay means.

9. A system for monitoring loads that are intermittently applied to a force carrying member comprising a transducer mounted on said member for developing electrical output signals substantially proportional to the loads exerted on said member, electrically operated means responsive to said transducer signals for monitoring the loadings on said member, said monitoring means including a main circuit board and a plurality of individual modules, said modules each having a base with at least one electrical element mounted thereon, said base having circuit means thereon to which said elements are electrically connected, said base of each module having a plurality of mounting and conductor pins extending from the underside thereof for engagement with said main circuit board at a predetermined location and for electrically coupling the modules and the components thereon to said circuit board, and said modules each being individually removable from said circuit board.

10. The load monitoring system of claim 9 in which said module base circuit means electrically couple the electrical elements of the module with selected of the module pins.

11. The load monitoring system of claim 10 in which said each module base circuit means has input and output leads coupled to a plurality of said pins.

12. The load monitoring system of claim 9 in which each said module has a straight row of said pins along at least two opposite sides thereof, and said main circuit board includes means for receiving the modular pins upon mounting of each module on said circuit board.

13. The load monitoring system of claim 12 in which said pins of each said row are spaced at intervals of less than ¼ of an inch.

14. The load monitoring system of claim 13 in which the pins of each said row are spaced at intervals of about 1/10 of an inch.

15. The load monitoring system of claim 14 in which said module mounting and conductive pins are round with a diameter of less than 0.04 inches.

16. The load monitoring system of claim 12 in which said main circuit board includes a plurality of connector strips each formed with a plurality of apertures for receiving the modular base pins when said modules are mounted on said circuit board, said connector strip apertures each having a conductive pin coupled with said main circuit board to facilitate conduction from said modular pins to said main circuit board, and said main circuit board having printed circuit means thereon with input and output leads coupled to a plurality of said connector strip pins.

17. The load monitoring system of claim 12 including a signal conditioning module with a fixed capacitor and variable capacitor both electrically coupled in parallel with said transducer when said signal conditioning module is mounted on said main circuit board, said signal conditioning module capacitance means being effective to limit the transducer output signal to a predetermined voltage for a given loading on said force carrying member.

18. The load monitoring system of claim 12 including a signal conditioning module with capacitance means electrically coupled in parallel with said transducer for limiting and conditioning the voltage of said transducer output signal, an amplifying module coupled to said signal conditioning module and having amplifying means for amplifying the current of said transducer output signal while maintaining the voltage from said signal conditioning module.

19. The load monitoring system of claim 18 including a power supply module including means for converting AC power to a regulated DC output supply for use in said system.

20. The load monitoring system of claim 18 including load indication means coupled to said amplifying means for indicating the loads on said member, and overload detection means coupled to said amplifying means for controlling overloading of said member.

21. The load monitoring system of claim 20 including data acquisition means coupled to said amplifying module for recording the loading on said member in relation to time.

22. A system for monitoring loads that are intermittently applied to a deformable member comprising a transducer fixed to said member and adapted to produce an electrical output signal having a voltage substantially proportional to the load applied, overload indication means activated in response to an output signal from said transducer for indicating when the loading on said member exceeds a preset value, a DC power supply, counting means having a numerical display, means responsive to actuation of said overload indication means for electrically coupling said DC power supply to said counting means for energizing said counting means and advancing said numerical display to count said overload indication, and means for automatically limiting DC current flow to said counting means to a relatively short period following said overload.

23. The load monitoring system of claim 22 in which said means for energizing said counting means includes a counter circuit that includes a first transistor having a base coupled to a voltage divider, a second transistor having its base coupled to the collector terminal of said first transistor, said counting means being connected to the collector terminal of said second transistor, means for producing a current flow through said voltage divider network to effect a voltage at the base of said first transistor which renders said first transistor conductive so as to prevent current flow to the base of said second transistor, means responsive to actuation of said overload indicating means for lowering the voltage at the base of said first transistor so as to render said first transistor non-conductive and said second transistor conductive, and means for energizing said counting means in response to conduction of said second transistor.

24. The load monitoring system of claim 23 in which said means for lowering the voltage at the base of said first transistor includes a contact that is closed to connect a leg of said voltage divider to ground in response to actuation of said overload indicating means.

25. The load monitoring system of claim 24 in which said means for automatically limiting current flow to said counting means includes a timer, a second normally closed contact in a line connecting said counter circuit to said timer, said timer being activated in response to said closure of said first contact for causing said second contact to be opened after said predetermined period following closure of said first contact.

26. The load monitoring system of claim 25 including capacitive means coupled across said transducer for charging towards a predetermined voltage limit as loading is applied to said member, amplifying means coupled to said transducer for amplifying the current of said transducer output signal while maintaining the voltage thereof, said overload indication means including an overload relay and relay control means coupled to said amplifying means and adapted to energize said overload relay when said transducer output signal exceeds a predetermined threshold voltage, and said first contact being closed in response to energization of said overload relay.

27. The load monitoring system of claim 26 including a second relay coupled in series with said timer, said first contact upon closure completing a circuit that energizes said second relay after a predetermined relatively short period as established by said timer, and said second contact being movable to an open position in response to energization of said second relay.

28. A system for monitoring the intermittent loads that are incurred on the load carrying member of an operating press comprising
   a transducer for producing an electric output signal proportional to the load applied,
   capacitive means coupled across said transducer for charging towards a predetermined voltage limit as the load is applied,
   amplifying means coupled to said transducer for amplifying said electrical output signal,
   an overload relay, relay control means coupled to said amplifying means and adapted to energize said relay when said transducer output signal exceeds a predetermined threshold value,
   overload detection and control means operative in response to energization of said overload relay, said overload detection and control means including means for shutting down the operation of said press,
   overload reset means selectively movable from an operative position to a reset position for de-energizing said overload relay following an overload, and
   reset override means automatically operable after a predetermined relatively short period following movement of said overload reset means to said reset position for overriding said first reset means and again rendering said overload relay operative to control loading on said member even though said overload reset means is maintained in said reset position.

29. The load monitoring system of claim 28 including a DC power supply, said overload reset means being movable between an operative position connecting said overload relay to said power supply and a reset position disconnecting said overload relay from said power supply, said overload reset override means including a bypass line and means responsive to movement of said overload reset means to said reset position for coupling said overload relay to said power supply through said bypass line.

30. The load monitoring system of claim 29 in which said means for coupling said overload relay to said bypass line includes a timer circuit, said timer circuit including a timer, means energizing said timer in response to movement of said overload reset means to said reset position, an overload reset relay, means for energizing said overload reset relay after a predetermined relatively short period as established by said timer following movement of said overload reset means to said reset position, and means for coupling said overload relay to said DC power supply in response to energization of said overload timer relay.

31. The load monitoring system of claim 30 in which said transducer includes a pair of output terminals, input reset means movable from an inoperative position to a reset position coupling a short circuit across said transducer terminals, input reset override means for automatically disconnecting said short circuit after a predetermined relatively short period following movement of said input reset means to said input reset position even though said input reset means is maintained in said reset position.

32. The load monitoring system of claim 31 in which said input reset override means includes a normally closed contact in said short circuit, an input reset relay coupled to said reset timer and energized after a predetermined period as established by said timer following movement of said input reset means to said input reset position, and said short circuit contact being opened in response to energization of said input reset relay.

33. The load monitoring system of the claim 28 in which said overload detection means includes an overload light, a latching contact that is closed in response to energization of said overload relay to complete a circuit including said light to energize said light, a releasing relay that is energized in response to movement of said overload reset means to said reset position, and said latching contact being movable to an open position de-energizing said light in response to energization of said releasing relay.

* * * * *